April 26, 1960     H. E. SINGLETON ET AL     2,933,925
PRECISION GYROSCOPE

Filed March 14, 1956                              2 Sheets-Sheet 1

HENRY E. SINGLETON
HAROLD F. ERDLEY
INVENTORS

BY

*Seymour M. Rosenberg*
ATTORNEY

April 26, 1960 H. E. SINGLETON ET AL 2,933,925
PRECISION GYROSCOPE
Filed March 14, 1956 2 Sheets-Sheet 2

HENRY E. SINGLETON
HAROLD F. ERDLEY
INVENTORS

BY
Seymour M. Rosenberg
ATTORNEY.

United States Patent Office 2,933,925
Patented Apr. 26, 1960

2,933,925

PRECISION GYROSCOPE

Henry E. Singleton, Downey, and Harold F. Erdley, Los Angeles, Calif., assignors, by mesne assignments, to Litton Industries, Inc., Beverly Hills, Calif., a corporation of Delaware Application March 14, 1956, Serial No. 572,175

3 Claims. (Cl. 74—5.4)

This invention relates to a precision gyroscope, and more particularly to a low drift precision two-degree-of-freedom gyroscope which includes a floated rotor assembly and a floated gimbal, and which employs jewel-and-pivot bearings for rotatably guiding the rotor assembly with respect to the gimbal and the gimbal with respect to the gyro housing.

From the lay point of view, practically all gyros employed as control instruments are generally considered to be precision devices. However, the relatively recent concept of employing inertial autonavigators and guidance systems for controlling sustained flight of aircraft has brought forth a need for ultra-precision gyros whose sensitivity and accuracy must be several orders of magnitude greater than that of pre-existing gyros.

When the need for these truly precise gyros was first recognized it was immediately believed by those skilled in the gyro art that the accuracy requirements could only be met by single-degree-of-freedom gyros, and that two-degree-of-freedom gyros could not be utilized because of several factors which were believed to be inherent limitations. Firstly, it was argued that the requirements of using two sets of bearings defining both inner and outer gimbal axes would produce error torques far larger than the minimum which could be tolerated, especially since the outer gimbal bearings would be loaded by a gimbal as well as by the gyro rotor assembly and the normal preload to prevent end play. Secondly it was considered that even if it were assumed that bearing error torques could be reduced, the accuracy of a two-degree-of-freedom gyro having a given volume could not compare with that of a single-degree-of-freedom gyro of the same volume for the angular momentum of the two-degree-of-freedom gyro would be less than that of the single-degree-of-freedom unit because of the volume required for the gimbal ring. Still other reasons advanced for utilizing single-degree-of-freedom gyros were that they were less expensive and complex, and also, that they were supposedly easier to balance.

After expending a great amount of time and effort the art has produced several single-degree-of-freedom gyros capable of performing in stabilized platforms of inertial guidance systems, one of these gyros employing a rotor-and-motor assembly supported by air bearings, and another utilizing a floated rotor-and-motor assembly suspended by a pair of jewel-and-pivot bearings which are cushioned against shock through the utilization of a viscous flotation liquid. The utility of both of these gyros, however, has been limited by several extremely important factors. Firstly, the elimination of bearing error torques at first thought readily achievable in single-degree-of-freedom gyros has not been achieved, principally because the bearings must take the relatively high lateral loads which follow from precession of the rotor in response to a rotational movement about the gyro's sensitive axis. This limitation has been especially severe in those single-degree-of-freedom gyros employing a pair of jewel-and-pivot bearings because relatively large error torques are easily developed, and moreover, the bearing pivots are frequently sheared off completely in response to input torques of only intermediate magnitude.

Still another extremely important disadvantage in the foregoing single-degree-of-freedom gyros has been encountered when a number of these units are applied to platform stabilization. More especially, it has been found that when three single-degree-of-freedom gyros are utilized to control the attitude of a stabilized platform the application of a counter-precessing correction torque to one gyro that has been precessed by an input torque results in inter-axis cross coupling whereby one or both of the other gyros are erroneously precessed. The only solution for eliminating this source of system error and drift is the use of a complex servo network having an extremely complicated transfer function whereby the servo system of each platform axis receives compensating feedback signals from the servo systems of the other platform axes.

In spite of the foregoing systems limitations on the use of single-degree-of-freedom gyros, only one attempt has been made to employ two-degree-of-freedom gyros in an inertial autonavigation system. The two-degree-of-freedom gyro utilized in this attempt employs a gyro gimbal which is suspended from the gyro housing by a pair of relatively long and fine torsion wires defining an outer gimbal axis, and a floated rotor assembly which is coupled to the gimbal by another pair of torsion wires which define an inner gimbal axis. The selection of torsion wire bearings for use in this device was made under the theory that it is better to use bearings which have a relatively high but consistent error torque than to use other forms of bearings which, if employed in the same structure, would produce unpredictable error torques which at times would be equally as large. However, the use of torsion wire bearings, together with the electrical compensating networks required to be used therewith, has resulted in a two-degree-of-freedom gyro whose sensitivity and accuracy are less than that of single-degree-of-freedom gyros, and gyro drift rates on the order of one tenth of a degree per hour are the best achievable.

The present invention, on the other hand, obviates the above and other disadvantages of the prior art precision gyros by providing a relatively compact two-degree of-freedom gyro in which drift rates of the order of one hundredth of a degree per hour are achievable. According to the basic concept of the invention, gyro bearing error torques are substantially eliminated through the use of a combination of elements which cooperate to provide extremely small bearing surfaces and to remove all static and precession loads from these bearing surfaces. More specifically, the two-degree-of-freedom gyro of the invention includes a precisely floated rotor-and-motor assembly, a precisely floated gimbal, and two pairs of jewel-and-pivot bearings which serve essentially as load-less guides for guiding the rotor assembly with respect to the gimbal along an inner gimbal axis and the gimbal with respect to the associated gyro housing along an outer gimbal axis.

Through the utilization of the foregoing combination the gyro rotor-and-motor assembly and the gyro gimbal appear weightless to the bearings, thereby removing all static loads. Moreover, since the gyro has two degrees of freedom it is not called upon to precess in response to input torques and hence no precession torques are placed upon the bearings. Consequently, the jewel-and-pivot bearings may be made much smaller than similar bearings employed in single-degree-of-freedom gyros, and moreover, need not be preloaded but may be made to provide merely a close tolerance fit.

In accordance with the invention, the gyro gimbal may be floated in either of two manners, namely, by fabricating the gimbal of material less dense than the fluid and adding weight at proper places, or by fabricating the gimbal of material denser than the flotation fluid and incorporating hollow spaces therein to provide the desired equality between gyro mass and the mass of the fluid displaced. In either case the gimbal may be designed to provide substantially perfect flotation whereby the mass differential between the gimbal and the fluid displaced thereby never exceeds a small fraction of one percent of the gimbal mass.

It is, therefore, an object of the invention to provide a precision two-degree-of-freedom gyro in which bearing error torques are substantially eliminated by the elimination of static and precession loads from the bearings.

Another object of the invention is to provide a precision two-degree-of-freedom gyro wherein bearing torques are substantially eliminated by utilizing a precisely floated rotor-and-motor assembly and a precisely floated gimbal in combination with two pairs of jewel-and-pivot bearings.

A further object of the invention is to provide a precision two-degree-of-freedom gyro wherein error torques are substantially eliminated by employing two pairs of close tolerance fitted jewel-and-pivot bearings for guiding the positions of a precisely floated gimbal and rotor-and-motor assembly.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
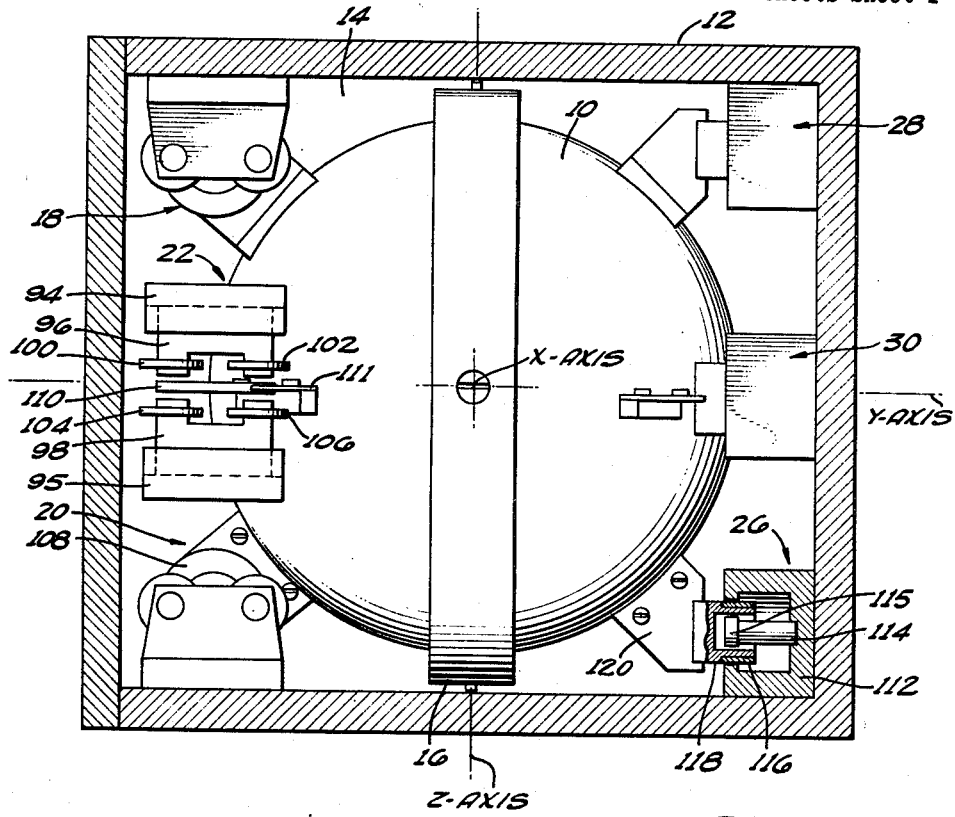
Fig. 1 is an elevation view, partly in section, of the precision two-degree-of-freedom gyro of the invention.

With reference now to the drawings, wherein like or corresponding parts are designated by the same reference characters throughout the several views, there is shown in Fig. 1 a precision two-degree-of-freedom gyro, constructed in accordance with the teachings of the invention, which has an extremely low drift rate and which is suitable for use in light weight inertial navigation systems. Although the mere fact that a gyro may be utilized in an inertial navigator tacitly implies that the gyro is a precision instrument with a relatively low drift rate, the gyro of the invention comprises a new and novel combination of elements which cooperate to produce a precision instrument whose drift rate is several orders of magnitude lower than that of any two-degree-of-freedom gyro heretofore conceived.

According to the basic concept of the invention, the two-degree-of-freedom gyro of Fig. 1 includes a precision rotor-and-motor assembly 10 which is floated very accurately within a rigid outer housing member 12 by a suitable high density flotation liquid 14, a precision gimbal 16 which is relatively rigid and which is also accurately floated within housing member 12, and two pairs of jewel-and-pivot bearings which respectively intercouple rotor-and-motor assembly 10 to gimbal 16 along one of the gyro's axes of freedom, and gimbal 16 to outer housing member 12 along the other of the gyro's axes of freedom, only the pivots of this latter pair of bearings being visible in Fig. 1. For purposes of description, the outer gimbal axis of the gyro is designated the Z axis while the inner gimbal axis is designated the X axis, the axis designated in Fig. 1 as the Y axis corresponding to the spin axis of the gyro's rotor element.

In addition to the foregoing elements the gyro also includes two pairs of electromagnetic error signal pick-off assemblies which are employed for detecting rotational displacement of rotor-and-motor assembly 10 relative to outer housing member 12. More particularly, the specific embodiment of the invention shown in Fig. 1 includes a pair of error signal pick-off assemblies, generally designated 18 and 20, for detecting rotational movement of the rotor-and-motor assembly about the X axis, and a pair of error signal pick-off assemblies for detecting rotational movement of the rotor-and-motor assembly about the Z axis, only one pick-off assembly designated 22 being visible in Fig. 1. The reason for employing two error signal pick-off assemblies to indicate rotational torques about each of the gyros sensitive axes is to distinguish pure rotational torques about the associated axis from any minute translational movements of the rotor-and-motor assembly which conceivably could occur under certain conditions of temperature and acceleration.

The gyro of the invention further preferably includes two pairs of torquer assemblies for applying to the rotor-and-motor assembly predetermined correction torques. For example, if the gyro is utilized for stabilizing the stabilized platform of an inertial guidance system, torquer assemblies may be used for entering correction torques representative of earth rate and aircraft rate, these torques being utilized to precess the gyro rotor-and-motor assembly to maintain the gyro rotor in a predetermined attitude with respect to earth throughout the entire time period that the gyro is operational. The gyro shown in Fig. 1, for example, includes two torquers 26 and 28 for applying torque about the X axis to precess the rotor about its Z axis, and two torquers for applying torque about the Z axis to precess the rotor about the X axis. Only one torquer, designated 30, of this latter pair of torquers is visible in the view of Fig. 1, the other torquer of the pair being symmetrically disposed behind torquer 30. Again the use of a pair of torquers in lieu of a single unit for applying torque to the rotor-and-motor assembly permits the application of purely rotational torques and consequently further minimizes the possibility of creating any undesired frictional restraining torques in the gyro bearings.

Figure 2:
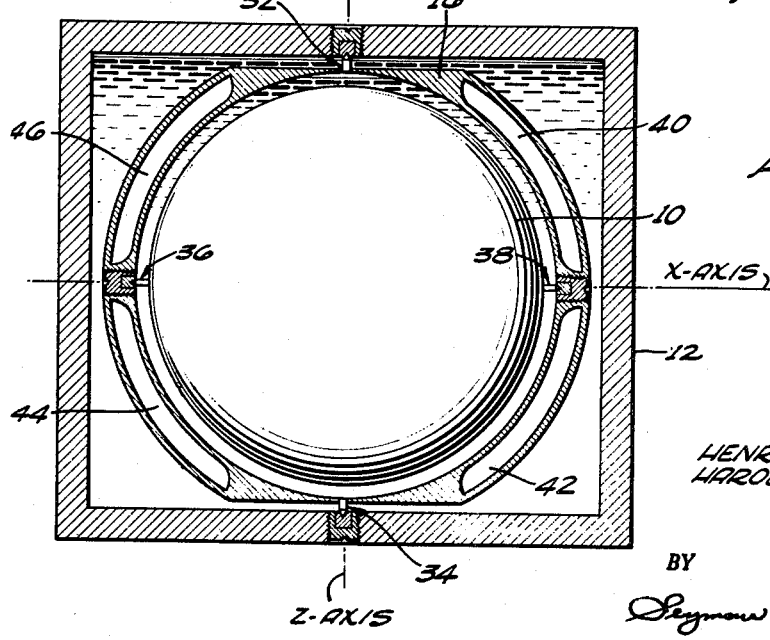
Fig. 2 is a sectional view of one form of floated gimbal which may be employed in the precision gyro of Fig. 1.

With reference now to Fig. 2, there is shown a cross-sectional view of floated gimbal 16 and of the jewel-and-pivot bearings employed for rotatably guiding rotor-and-motor assembly 10 within outer housing 12, the outer gimbal axis bearings being designated 32 and 34, while the inner gimbal axis bearings are designated 36 and 38, respectively. For ease in fabrication and in final adjustment and in addition, to eliminate acceleration caused error torques, the bearing jewels for the outer gimbal axis are preferably mounted in housing member 12, while the bearing jewels for the inner gimbal are mounted in floated gimbal 16, each bearing jewel being seated in an associated threaded mounting screw. In accordance with the invention the jewels may be sapphires, while the pivots are preferably formed from a relatively hard material, such as steel, for example, and are tapered and honed at their bearing ends to provide an effective bearing radius of the order of five to twenty thousandths of an inch when seated in their associated jewels.

It will be recognized that gimbal flotation may be achieved in either of two manners. Firstly the gimbal could be fabricated from material whose density is slightly less than the density of the flotation fluid so that the additional mass of the jewel-and-pivot bearing components affixed to the gimbal would precisely float the gimbal. On the other hand, the gimbal may be designed to include hollow regions and thereby permit the use of more dense material in the gimbal. It is clear, therefore, that the form and composition of the gimbal ring are of necessity dependent upon the density of the particular flotation liquid selected for floating the gimbal and the gyro rotor-and-motor assembly.

The selection of the flotation liquid is in turn influenced by a number of factors which must be considered as basic to the gyro design. Firstly it must be relatively dense, to permit flotation of the heaviest possible rotor-and-motor assembly for any given volume, since the angular momentum of the gyro rotor, which is directly proportional to the mass of the rotor, should be as large as possible. Secondly, the flotation liquid should have the proper viscosity to permit optimum damping of the rotor-and-motor assembly. Still other factors which may influence the selection of the flotation liquid are that it must be relatively inert so as not to react with any of the gyro materials exposed thereto, and it should have a coefficient of thermal expansion compatible with that of the gyro gimbal and the rotor-and-motor assembly so that the flotation of these elements is not adversely affected by temperature variations. Finally, the flotation liquid must be capable of transferring to the outer housing member of the gyro heat generated within the gyro rotor-and-motor assembly. One of several known flotation liquids which at least partially satisfy the criteria imposed by the foregoing factors is sold under the trade name Flurolube FS by the Hooker Electrochemical Co. of Niagara Falls, New York, this substance having a density of 1.86 grams per cubic centimeter and a viscosity of 5 centistokes.

With reference once more to Fig. 2, it will be recognized that if Flurolube is utilized as the flotation liquid, then the gimbal could be formed from either solid magnesium, or from a material denser than the flotation liquid, such as aluminum, with hollow regions to provide the necessary buoyancy for achieving substantially perfect flotation. It will also be recognized, however, that the gimbal utilized in the gyro of the invention must provide an extremely rigid and dimensionally stable structure in order to make the gyro as insensitive as possible to vibration, aging and temperature variations. Since magnesium may not provide the dimensional stability requisite in a particular application of the gyro, it may be found preferable to construct the gimbal of a denser material such as aluminum with one or more hollow regions, such as the cavities designated 40, 42, 44 and 46 in the floated gimbal shown in Fig. 2.

Figure 3B:
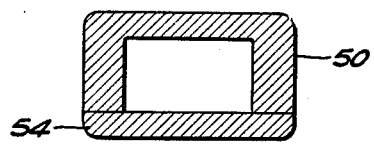
Figs. 3a and 3b are cross sections of the gyro gimbal of Fig. 2 illustrating two different forms of construction which may be employed therein.
Figure 3A:
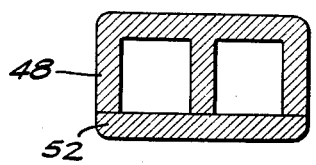

Referring now to Figs. 3a and 3b there are shown two different cross-sectional configurations which may be used in an aluminum gimbal to provide the desired flotation thereof. In the fabrication of the gimbal the cavities may be formed by machining one or more grooves in the inner surface of a solid aluminum ring, such as the rings designated 48 and 50 in Figs. 3a and 3b. The inner surface of the ring is then enclosed, as by welding a relatively thin strip of aluminum, such as strips 52 and 54 in Figs. 3a and 3b, to the inner surface of the associated ring, after which the ring is first heat treated to remove stresses and then precision machined and balanced.

It should be emphasized that the term flotation, as herein utilized, does not merely imply that buoyancy forces are exerted on the floated gimbal and rotor-and-motor elements, but instead means that the weight of the element floated is substantially identical to the weight of the flotation fluid displaced by the element. For example, in floating the gimbal, the total mass differential between the gimbal and the fluid it displaces should be limited to a small fraction of one percent of the gimbal mass over the entire temperature range through which the gyro is capable of operating.

In view of the foregoing factor, it will be realized that the final balancing of the gyro gimbal must be undertaken with several goals in mind. Firstly, the gyro mass and volume should be controlled to provide substantially perfect flotation of the gimbal. Concomitantly, however, the gimbal should also be mechanically balanced so that its center of mass will substantially coincide with its center of buoyancy when the gimbal is subsequently floated, the obvious reason for this latter balancing requirement being to prevent lateral forces from being exerted on the outer gimbal bearings when the gimbal is floated.

It will be recognized that similar balancing limitations are imposed on the gyro rotor-and-motor assembly in order to remove substantially all static loads on the inner gimbal axis bearings, these flotation balancing requirements being to some extent distinct from the usual dynamic balancing requirements imposed on the rotor-and-motor assembly. When both the gyro gimbal and the rotor-and-motor assembly have been properly balanced and floated, the jewel-and-pivot bearings which define the inner and outer gimbal axis are substantially free of static loads and operate essentially as guiding members only. This factor, coupled with the fact the gyro is inherently free of precession torques owing to its two degrees of freedom, provide a precision two-degree-of-freedom gyro in which drift rates of the order of .01 degree per hour are readily obtainable.

Figure 4:
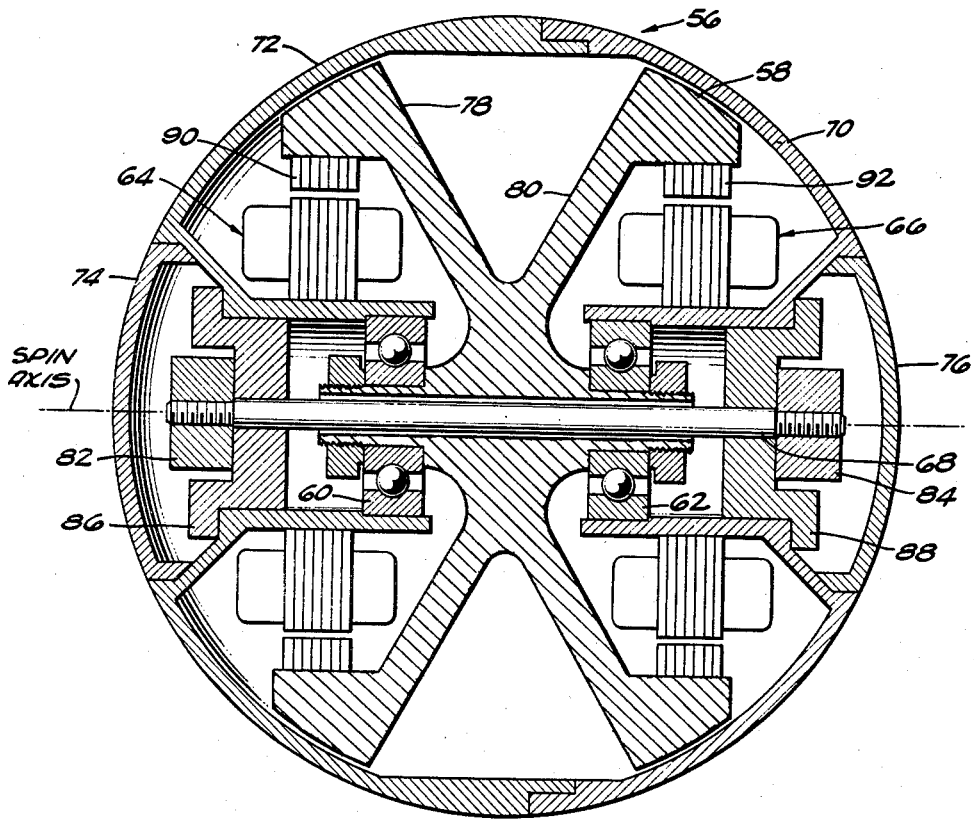
Fig. 4 is a sectional view of one form of rotor-and-motor assembly which may be employed in the precision two-degree-of-freedom gyro of the invention.

With reference now to Fig. 4, there is shown one form of gyro rotor-and-motor assembly which may be employed in the precision gyro of the invention. Basically the assembly comprises a spherical housing shell, generally designated 56, a gyro rotor 58 mounted on the housing shell by a pair of pre-loaded ball bearings 60 and 62, a pair of hysteresis motors generally designated 64 and 66 for rotating rotor 58, and a strut assembly including a tungsten strut 68 for pre-loading the rotor bearings.

As shown in Fig. 4, spherical housing shell 56 comprises two hemispherical members 70 and 72 with mating flanges so that the two members may be engaged to provide a substantially spherical shell. Each of the hemispherical members also includes an apertured end and a centrally located rigid tubular structure for mounting the outer race of one of the gyro bearings, the bearings being engaged by internal shoulders within the tubular structure when the gyro is assembled. In addition, spherical housing shell 56 includes a pair of polar caps 74 and 76 which enclose the apertured ends of hemispheres 70 and 72 after the gyro has been assembled.

It is known that the angular momentum provided by a gyro rotor is a direct function not only of rotor speed, but also of rotor mass and radius of gyration; consequently the rotor is preferably constructed of the densest material permissible within the limits imposed by the available buoyancy and the fact that the gyro rotor should be constructed of a relatively inelastic material so as to avoid shifting the rotor's effective center of mass in response to applied accelerations. In addition, as much of the rotor mass as possible should be located as far from the spin axis as practicable so as to maximize the rotor's radius of gyration.

With reference once more to Fig. 4, gyro rotor 58 may be fabricated from titanium, which satisfies the mechanical and structural requirements imposed upon the rotor material, and may be constructed in the form of two symmetrical cones 78 and 80 which are joined at their apices, the use of a double cone shaped rotor being advantageous because conical structures are less susceptible to flexure than a mere planar structure of equivalent thickness. Consequently, a large proportion of the gyro mass may be symmetrically concentrated in the outermost portion of the rotor, as shown in Fig. 4, so as to maximize the radius of gyration of the rotor.

As shown in Fig. 4 the hub of the gyro rotor is shouldered on both sides to engage the inner races of the gyro bearings, and in addition, is apertured in its center to permit strut 68 to pass therethrough. The ends of strut 68 are threaded to receive two adjusting nuts 82 and 84 which in turn engage a pair of stressing plugs 86 and 88, respectively, these plugs being utilized in conjunction with strut 68 and adjusting nuts 82 and 84 to properly stress the gyro elements and to remove all play from the gyro bearings. It will be appreciated by those skilled in the art that the design and composition of strut 68 is dependent not only upon the forces required to properly load the gyro bearings, but also upon the coefficients of thermal expansion of the gyro housing and rotor materials.

The two hysteresis motors 64 and 66 employed to rotate rotor 58 are also symmetrically disposed within housing 56, the field windings or stators of the motors being rigidly affixed to the external periphery of the tubular portions of hemispherical members 70 and 72. The rotors of the motors, on the other hand, comprise two annular bands 90 and 92 of magnetic material which are affixed to the gyro rotor and which function in response to electrical energization of the stator windings to rotate the gyro rotor at a synchronous speed. It is to be understood, of course, that the rotor-and-motor assembly of Fig. 4 is merely illustrative of one form of assembly which may be utilized in the precision two-degree-of-freedom gyro of the invention, and that other known forms of rotor-and-motor assemblies may be employed therein without departing from the scope of the invention.

Referring once more to Fig. 1, the floated rotor-and-motor assembly of the particular embodiment of the invention shown in the drawings also includes several additional components which contribute to the mass and volume of the assembly and which must, therefore, be considered in its design in order to achieve the desired degree of flotation and balance. These components are the sensing elements of the error signal pick-offs which are employed to detect rotational movement of the gyro rotor-and-motor assembly, and the movable elements of the gyro torquers.

Referring now with particularity to error signal pick-off assembly 22 in Fig. 1, each pick-off comprises a pair of mounting brackets 94 and 95 which are affixed to outer housing member 12 and which are used to support a pair of magnetic circuit elements 96 and 98 in spaced relationship, each pick-off assembly further including four excitation coils 100, 102, 104 and 106 which are wound on the associated magnetic circuit elements and which are electrically interconnected series aiding. In operation the excitation coils are energizable from an external source of alternating current electrical energy to provide an alternating magnetic field in the two air gaps between magnetic elements 96 and 98, the field strength and gradient in the air gaps being substantially identical.

The sensing element of each pick-off assembly includes a pancake sensing coil, such as coils 108 and 110 in pick-off assemblies 20 and 22, which is affixed to the outer shell of the gyro rotor-and-motor assembly. As shown in Fig. 1 by the plan view of pick-off assembly 22 and by the elevation view of pick-off assembly 20, in the null position of the gyro the pancake coil in each pick-off assembly is positioned symmetrically within the air gaps in its associated magnetic circuit so that the net flux linking the turns of each sensing coil is zero. Consequently no error signal is induced in the sensing elements in the null position.

It will also be recognized that if the pancake coil in a pick-off assembly is moved from its null position in a direction normal to the plane of the coil, the net flux linking the coil still remains essentially zero owing to the similar magnetic fields in the pick-off's air gaps. However, if the coil is moved in a direction parallel to the plane of the coil, a net flux of predetermined magnitude and sense links the coil, the magnitude of the net flux corresponding to the extent of the movement while the sense of the flux corresponds to the direction of the movement. Consequently an error signal is induced in the sensing coil, the amplitude of the error signal corresponding to the magnitude of the coil movement while the phase of the signal with respect to the signal applied to the pick-off excitation coils corresponds to the direction of movement.

With reference again to Fig. 1, consider the operation of pickoff assemblies 18 and 20 in detecting a rotational displacement of gyro rotor-and-motor assembly 10 about the inner gimbal or X axis. As soon as a minute rotational displacement from the null position about the X axis occurs, signals are induced in the sensing coils of both pick-off assemblies. By interconnecting the pick-off coils in series, a resultant error signal is produced having an amplitude of substantially twice the amplitude of each individual error signal.

If on the other hand the disturbance from the gyro null position creates only a minute translational movement of the gyro rotor-and-motor assembly to the left or right, the signals induced in pick-offs 18 and 20 will be 180° out of phase with respect to each other, and hence will produce no resultant error signal. It will also be observed that a disturbance from the null position by a rotational movement about the outer gimbal axis will also fail to produce a resultant error signal from pick-offs 18 and 20 since the movement of their sensing coils will be normal to the plane of the coils and hence the net flux linking each coil will remain essentially zero.

The electromagnetic torquers employed in the particular embodiment of the invention shown in the drawings are known to the art as voice-coil torquers, and as exemplified by the cutaway view of torquer 26, include a cup-like yoke member 112 of magnetic material with a centrally positioned rod-like permanent magnet 114 seated therein. The permanent magnet may be composed of Alnico V, for example, and is capped at its free end by a soft iron pole piece 115. The torquer is completed by a voice-coil winding 116 which is wound on an associated bobbin 118, the bobbin being affixed to the spherical shell of rotor-and-motor assembly 10 by a mounting bracket 120 and being positioned within member 112 and around magnet 114. In operation the serial application of an electrical signal to the voice-coil windings in the torquers of a torque pair functions to apply a purely rotational torque to the rotor-and-motor assembly, as previously described, to thereby precess the gyro.

It should be noted that the application of a torquing current to a pair of torquer coils causes a demagnetizing effect in one torquer and a magnetizing effect in the other torquer for the obvious reason that the flux generated in one torquer coil opposes the field produced by its magnet while the flux generated in the other torquer coil aids the field produced by its magnet. Consequently, the hysteresis effect within each torquer magnet will result in an incremental change in the quiescent flux produced by the magnet after the magnet has been subjected to either a magnetizing or demagnetizing effect. However, by employing a pair of matched and properly stabilized permanent magnets in the torquers of a torquer pair these magnetizing and demagnetizing effects, although essentially non-linear in their behavior, can be made to cancel each other out, thereby providing a linear and stable torquing system.

It will also be noted that all of the magnetic material in the pick-off and torquer assemblies is supported by the gyro's outer housing, only the pick-off sensing coils and the torquer coils, together with their non-magnetic mounting brackets, being mounted on the rotor-and-motor assembly; accordingly, the effective weight of the elements affixed to the rotor-and-motor assembly may be minimized while still permitting the use of relatively strong magnetic fields in the transducers. Moreover, the rotor-and-motor assembly is thus made impervious to stray magnetic fields, thereby eliminating an additional source of error torques.

It will be recognized by those familiar with precision gyro construction that the electrical input conductors to the gyro motors, torquer coils and pick-off coils must not mechanically intercouple the rotor-and-motor assembly with the outer housing member, or in other words, should not be permitted to exert any spring forces on the rotor-and-motor assembly since such forces would introduce error torques and thereby reduce the sensitivity and accuracy of the gyro. Although not shown specifically in the drawings, the electrical connections are preferably made through relatively fine wires which are also relatively long, one end of each wire being connected to the element which it is used to energize whole the other end is connected to an insulated terminal in the outer housing of the gyro at a point remote from the associated element. Since numerous techniques and wire types for providing essentially "no-torque" connections are well known to the precision instrument art, further description of there interconnections is considered unnecesary.

It will also be recognized by those skilled in the gyro art that although the error signal pick-off assemblies and torquer assemblies shown in Fig. 1 have been described as being sensitive or operational about the inner gimbal X axis and the outer gimbal Z axis, the positioning of the transducers could be altered so that they would be operational about a pair of virtual axes different from the inner and outer axes. The fact that this may be done becomes more apparent when it is realized that the transducers are employed to sense the direction and magnitude of movement of the gyro rotor-and-motor assembly with respect to the gyro housing, and not necessarily about the inner and outer axes of the gyro gimbal.

It is to be expressly understood that the particular form of the pick-off and torquer assemblies shown and described is not to limit the invention, not is the form of the particular rotor-and-motor assembly shown in Fig. 4. While it is true that the design of these components vitally effects the sensitivity and accuracy of a precision gyro, the basic contribution of this invention is the elimination of other sources of error torques through the utilization of a floated gimbal, which in combination with a floated rotor-and-motor assembly and two pairs of jewel-and-pivot bearings provide a precision two-degree-of-freedom gyro of exceptional sensitivity and accuracy. Accordingly the invention is to be limited only by the spirit and scope of the appended claims.

What is claimed as new is:

1. In a precision two-degree-of-freedom gyro, the combination comprising: a housing member; a spherical rotor-and-motor assembly positioned within said housing member, said assembly having a spin axis and a center of mass; a gimbal positioned within said housing member, the internal dimension of said gimbal being larger than the diameter of said rotor-and-motor assembly; a first pair of jewel-and-pivot bearings for rotatably mounting said rotor-and-motor assembly on said gimbal, said first pair of bearings having a bearing radius of the order of ten thousandths of an inch, and defining an inner gimbal axis, each bearing of said first pair of bearings having a jewel and a pivot relatively positioned so as to exert zero preload forces upon each other; a second pair of jewel-and-pivot bearings for rotatably mounting said gimbal on said housing member, said second pair of bearings having a bearing radius of the order of ten thousandths of an inch and defining an outer gimbal axis, each bearing of said second pair of bearings having a jewel and a pivot relatively positioned so as to exert zero preload forces upon each other; a flotation liquid filling said housing member and surrounding said rotor-and-motor assembly and said gimbal, the masses of the liquid displaced by said rotor-and-motor assembly and by said gimbal being substantially equal to the masses of said assembly and gimbal, respectively; and torquer means selectively operable to apply substantially pure force couples free of any net translational force to said rotor-and-motor assembly about said inner and outer gimbal axes for precessing said rotor-and-motor assembly about said outer and inner gimbal axes, respectively; whereby said first and second pairs of jewel-and-pivot bearings are substantially free of static loads and said rotor-and-motor assembly may be precessed without loading said bearings.

2. In a precision two-degree-of-freedom gyro the combination comprising: an outer housing member; a rotor- and-motor assembly floated within said housing member and having a center of mass and a center of buoyancy coincident with said center of mass, said asesmbly also having a spin axis passing through said center of mass; a floated gimbal ring positioned within said housing member and around said rotor-and-motor assembly; two pairs of jewel-and-pivot bearings rotatably intercoupling said rotor-and-motor assembly to said gimbal and said gimbal to said housing member, the axes defined by said bearing pairs and said spin axis being mutually perpendicular and passing through the center of mass of said rotor-and-motor assembly, each of said bearings having a jewel and a pivot relatively positioned so as to exert zero preloads upon each other, each of said bearings having a bearing radius in the range between five and twenty thousandths of an inch; and first and second pairs of torquers directly intercoupling said housing member and said rotor-and-motor assembly, said first pair of torquers being selectively operable to apply a first pair of equal parallel oppositely directed forces to said rotor-and-motor assembly to torque said rotor-and-motor assembly about the axis defined by one of said pairs of bearings and said second pair of torquers being selectively operable to apply a second pair of equal, parallel, oppositely directed forces to said rotor-and-motor assembly to torque said rotor-and-motor assembly about the axis defined by the other of said pairs of bearings, to thereby precess said rotor-and-motor assembly about the axes defined by said bearing pairs without loading said bearings.

3. In a precision two-degree-of-freedom gyro, the combination comprising: a housing member; a rotor-and-motor assembly including a dynamically balanced rotor having a spin axis, motor means coupled to said rotor for rotating said rotor about said spin axis, and a spherical shell surrounding said rotor and said motor means and connected to said motor means, the center of mass of said rotor coinciding with the geometrical center of the volume defined by said spherical shell; a gimbal ring surrounding said shell; first and second pairs of jewel-and-pivot bearings respectively interconnecting said shell to said gimbal and said gimbal to said housing member, each bearing having a bearing radius in the range between five and twenty thousandths of an inch and including a bearing jewel and a pivot positioned within said jewel, said first and second bearing pairs defining inner and outer gimbal axes mutually perpendicular with each other and with said spin axis; means for relatively positioning each of said bearing jewels and its corresponding pivot so as to exert zero preload forces upon each other; first and second pairs of torquers directly intercoupling said housing member and said rotor-and-motor assembly, said first and second pairs of torquers being selectively operable to apply to said rotor-and-motor assembly a plurality of forces free of any translational resultant, and comprising first and second force couples, to torque said rotor-and-motor assembly about said inner and outer gimbals, respectively, for precessing said rotor-and-motor assembly about said outer and inner gimbal axes respectively; and a flotation fluid surrounding said gimbal and said rotor-and-motor assembly, the weight of the liquid displaced by said gimbal and said rotor-and-motor assembly corresponding to the weight of said gimbal and said assembly whereby both said gimbal and said rotor-and-motor assembly are floated in said fluid.

References Cited in the file of this patent

UNITED STATES PATENTS

| | | |
|---|---|---|
| 1,927,882 | Gillmor | Sept. 11, 1934 |
| 2,352,346 | Schiffl | June 27, 1944 |
| 2,585,024 | Lundberg | Feb. 12, 1952 |
| 2,618,159 | Johnson | Nov. 18, 1952 |

FOREIGN PATENTS

| | | |
|---|---|---|
| 1,025,771 | France | Jan. 23, 1953 |